United States Patent
Smith

(10) Patent No.: US 9,126,872 B2
(45) Date of Patent: Sep. 8, 2015

(54) BREATHABLE GLOSSY SEALANT FOR CONCRETE AND MASONRY SURFACES

(76) Inventor: Paul A. Smith, Mentor, OH (US)

(*) Notice: Subject to any disclaimer, the term of this patent is extended or adjusted under 35 U.S.C. 154(b) by 262 days.

(21) Appl. No.: 13/291,551

(22) Filed: Nov. 8, 2011

(65) Prior Publication Data
US 2012/0183789 A1  Jul. 19, 2012

Related U.S. Application Data

(60) Provisional application No. 61/432,971, filed on Jan. 14, 2011.

(51) Int. Cl.
| B32B 27/00 | (2006.01) |
| C04B 41/00 | (2006.01) |
| C04B 41/48 | (2006.01) |
| C04B 41/63 | (2006.01) |

(52) U.S. Cl.
CPC ........... *C04B 41/009* (2013.01); *C04B 41/4826* (2013.01); *C04B 41/63* (2013.01); *Y10T 428/31663* (2015.04); *Y10T 428/31855* (2015.04)

(58) Field of Classification Search
None
See application file for complete search history.

(56) References Cited

U.S. PATENT DOCUMENTS

| 2,440,953 A * | 5/1948 | Iliff et al. .................... 106/148.1 |
| 3,472,719 A | 10/1969 | Lythgoe |
| 4,069,178 A * | 1/1978 | Mikami et al. ................... 554/77 |
| 4,071,489 A * | 1/1978 | Emmons et al. ............... 523/503 |
| 4,211,851 A * | 7/1980 | Sasayama ...................... 525/108 |
| 4,517,375 A | 5/1985 | Schmidt |
| 5,051,129 A | 9/1991 | Cuthbert et al. |
| 5,425,997 A | 6/1995 | Costin et al. |
| 6,090,885 A | 7/2000 | Kuo et al. |
| 6,302,951 B1 | 10/2001 | Odland et al. |
| 7,968,641 B2 | 6/2011 | Killilea |
| 2005/0279255 A1* | 12/2005 | Suzuki et al. ............ 106/287.11 |
| 2006/0135709 A1 | 6/2006 | Hasegawa et al. |
| 2007/0213492 A1* | 9/2007 | Mowrer et al. .................. 528/17 |
| 2008/0282935 A1* | 11/2008 | Miller ............................ 106/661 |
| 2009/0072183 A1* | 3/2009 | Peng et al. .................... 252/8.62 |
| 2010/0005743 A1* | 1/2010 | Anderson ........................ 52/314 |
| 2010/0159255 A1* | 6/2010 | Lee et al. ....................... 428/447 |
| 2010/0166967 A1 | 7/2010 | Fasano |
| 2012/0244288 A1* | 9/2012 | Young et al. ................ 427/385.5 |

FOREIGN PATENT DOCUMENTS

WO  WO 2009090252 A1 * 7/2009 ............ C08F 293/00

OTHER PUBLICATIONS

Derwent Accession No. 1975-64740W (1975).*
Derwent Accession No. 1985-308835 (1985).*
Reichhold, Inc., "Beckasol AQ" (2010) (http://www.reichhold.comlen/coatings-products.aspx? cat=Brands&pid=155)(2 pages).
Reichhold, Inc., "Beckasol AQ" (Jun. 2010) (http://www.reichhold.com/brochures/coatings/AQ%20Brochure,%20Jun%202010.pdf) (7 pages).
Ideas-For-Deck-Designs.Com, "What Deck Stain Should You Use?" (download date: Aug. 25, 2011) (http:// www.ideas-for-deck-designs.com/deck-stain.html)(3 pages).
Benjamin Moore, "Arborcoat Exterior Waterborne Translucent Stain" (1996-2011) (http://www.benjaminmoore.com/en-us/for-your-home/arborcoat-exterior-waterborne-translucent-stain-623)(2 pages).
HOUSEPAINTING101.COM, "Choosing the Right Primer" (2007) (http://housepainting101.com/choosing_primer.html) (5 pages).
Sherwin-Williams Company, "Matching Paint to Surfaces" (2011) (http://www.sherwinwilliams.com/ do_it_yourself/painting_techniques/how_to_paint/interior/plan/plan_match/)(pp. 2).
Rodda Paint Co., "Powerkote Silicone Alkyd" (Jun. 20, 2011) (http://www.roddapaint.com/professional/productdata/758801.aspx)(3 pages).
SSPC.ORG, SSPC-PS. 16.01, Silicone Alkyd Painting System for New Steel) (1995-2011) (http://www.sspc.org/ market-place/standards/sspc-ps-16-01-silicone-alkyd-painting-system-for-new-steel.html/) (1 page).
Stic-Adhesive Products, Co. "MIL-PRF-24635" (download date: Aug. 25, 2011) (http://milspec24635.com/) (44 pages).
W.R. Meadows, "Bellatrix-Premium Concrete Enhancer" (Sep. 2010) (http://www.wrmeadows.com/wrm00100.htm) (4 pages).

* cited by examiner

*Primary Examiner* — Kenneth Stachel
(74) *Attorney, Agent, or Firm* — Medley, Behrens & Lewis, LLC; Nathan Lewis

(57) ABSTRACT

A water-based concrete or masonry sealant includes an acrylic- or silicone-modified reaction product of an unsaturated drying oil and an alkyd, the reaction product being dispersed in aqueous solution; and a dispersion of metal salt catalyst in aqueous solution. A method of treating a previously sealed concrete or masonry substrate, includes the steps of: applying to the previously sealed concrete or masonry substrate a sealant comprising an acrylic- or silicone-modified reaction product of an unsaturated drying oil and an alkyd, the reaction product being dispersed in aqueous solution; an aqueous dispersion of metal salt catalyst, and water; and allowing the sealant to cure.

7 Claims, No Drawings

BREATHABLE GLOSSY SEALANT FOR CONCRETE AND MASONRY SURFACES

CROSS-REFERENCE TO RELATED APPLICATIONS

This application claims priority to U.S. provisional application 61/432,971, titled "Gloss restoration of sealed decorative concrete and masonry surfaces," which was filed on Jan. 14, 2011, and is incorporated herein by reference.

BACKGROUND

The most common mode of rejuvenating a previously sealed concrete surface, now dull and weathered, is to apply one or more applications of a solvent-borne acrylic lacquer containing acrylic solids dispersed in either an aromatic or mineral spirits solvent carrier.

Recently, due to requirements for reduced VOC emissions, flammable solvents such as acetone, tertiary-butyl acetate, para-chlorobenzenetrifluoride, and dimethyl carbonate have replaced most or all of the traditional petroleum solvents rendering the acrylic lacquers more difficult to apply during warm seasons. The evaporation rates of these VOC exempt solvents are much higher, leading to increased rates of drying. A phenomenon known as "cob webbing" can take place as more of the solvent evaporates before the resin has had an opportunity to completely flow out over the concrete surface leaving behind thin strands of cotton-like web over the surface of the sealant.

In an attempt to avoid the problems associated with solvent-based lacquers, water-based compositions have been developed that comprise emulsion polymerized acrylic copolymers and styrenated acrylic copolymers. These emulsions, when applied over non-porous substrates such as metal, typically produce a high gloss; however, when applied over porous surfaces such as concrete and masonry, only produce, at best, a satin finish or modest gloss. This reduced gloss is directly attributable to the water-like viscosity of the acrylic emulsions and their poor hold-out at the surface of the porous concrete or masonry. In addition, acrylic emulsions exhibit mediocre wetting characteristics due to the high surface tension of the continuous aqueous phase relative to the surface energy at the concrete interface. This phenomenon of poor wetting is exacerbated by the presence of highly absorptive pigments and metal stearates, which are used to produce decorative stamped concrete finishes. Commonly, stearate and pigments are left in the crevices and joints created within the geometric pattern left behind by a stamp imprint. Thus, acrylic emulsions do not provide high gloss, depth of finish, or good color rejuvenation.

Furthermore, the repeated resealing of concrete and masonry surfaces with solvent-based acrylic and styrenated acrylate solution resins initially leads to a high gloss finish, but frequently also leads to excessive film build up. Such resealing is often done annually to maintain its desired appearance. As a consequence of this increased film thickness, the moisture vapor transmission rate, known traditionally as the sealant's breathability to water vapor, is impeded drastically. This frequently results in the sealant turning milky white (blushing), down glossing, blistering, flaking and peeling. To remedy this problem, all the coats of sealant must be removed. Removal can be done mechanically or chemically, but only chemical removal is effective to maintain the appearance of stamped or decorative surfaces. The chemicals used to remove the sealant, however, are typically harsh, high in VOC, and will destroy the surrounding vegetation.

SUMMARY

A water-based concrete or masonry sealant includes an acrylic- or silicone-modified reaction product of an unsaturated drying oil and an alkyd, the reaction product being dispersed in aqueous solution; and a dispersion of metal salt catalyst in aqueous solution.

A method of treating a concrete or masonry substrate, includes the steps of: applying to the concrete or masonry substrate a sealant comprising an acrylic- or silicone-modified reaction product of an unsaturated drying oil and an alkyd, the reaction product being dispersed in aqueous solution; an aqueous dispersion of metal salt catalyst, and water; and allowing the sealant to cure.

A method includes the steps of providing a sealant including an acrylic- or silicone-modified reaction product of an unsaturated drying oil and an alkyd, the reaction product being dispersed in aqueous solution; an aqueous dispersion of metal salt catalyst, and water; and providing instructions for applying the concrete or masonry sealant to concrete.

A sealed concrete or masonry substrate includes a concrete or masonry substrate covered with a film comprising an acrylic- or silicone-modified reaction product of an unsaturated drying oil and an alkyd, the reaction product being dispersed in aqueous solution; an aqueous dispersion of metal salt catalyst, and water.

A method includes the steps of adding an acrylic- or silicone-modified reaction product of an unsaturated drying oil and an alkyd to a vessel; dispersing the acrylic- or silicone-modified reaction product of an unsaturated drying oil and an alkyd in water; adding a base to control pH of the reaction; allowing the alkyd to be neutralized by the base, and thereafter adding a metal salt catalyst.

The articles "a," "an," and "the," as used herein, mean one or more.

DETAILED DESCRIPTION

Decorative concrete will have an initial coat of sealer applied at the time of installation. The sealer wears over time losing its gloss and clarity. This disclosure relates to a gloss restoring breathable sealant in the form of a film-forming resin to be applied over previously sealed concrete, decorative stamped concrete, concrete pavers or other masonry surfaces.

In embodiments of the sealant disclosed herein, the sealant is water-based with a mild odor and contains very little solvent and is exclusive of fast evaporating, flammable solvents. In an embodiment of the sealant, the "cob webbing" phenomenon is eliminated. In embodiments, the sealant eliminates or has a very low VOC emission, such as, less than 350 g/L, for example, 0.001 to 10 g/L, 1 to 250 g/L, or 0.01 to 100 g/L). In embodiments, the sealant is also breathable, allowing for several coatings without causing an excessively hazy appearance (i.e. it is blush resistant). In an embodiment, the sealant is 50 to 100 times more breathable than traditional solvent-based sealants. In an embodiment, the sealant is non-flammable. The sealant may also have the flow properties of a solvent-based product, such as a lacquer-like viscosity, for example, 25 centipoise (cps) to 150 cps. The sealant is also capable of imparting an ultra-high gloss. For example, the gloss restoring sealant may be designed to bring the surface gloss of the concrete or masonry, such as stamped concrete, up to a minimum 20% gloss as measured by a gloss meter at a 60° specular angle, such as, for example, 20 to 25% gloss, or 24 to 30% gloss. The sealant also has excellent exterior weatherability and non-yellowing characteristics.

In an embodiment, the sealant includes an acrylic- or silicone-modified reaction product of an unsaturated drying oil and an alkyd that is dispersed in aqueous solution. In an embodiment, the dispersion may be present in an amount, for example, of 20 to 80% of the total sealant, such as 20 to 40%, 40 to 59%, or 25 to 70% by weight.

Water, the medium in which the acrylic- or silicone-modified alkyd resin is dispersed, may be present in the dispersion, for example, in an amount of 20 to 80%, such as 25 to 65%, or 30 to 50% by weight based on the total weight of the dispersion. The water, may, for example, be deionized water.

A cosolvent may also be present in the dispersion, such as a polar cosolvent. The cosolvent may be present, for example, in an amount of up to and including 10%, such as 0.001 to 10%, 0.1 to 5%, or 1 to 3%. Examples of co-solvents include: 2,2,4-trimethyl-1,3-pentanediol monoisobutyrate, normal butanol and ethylene glycol monobutyl ether. More than one co-solvent may be used, for example, in approximately equal ratios, such as ratios differing by less than 60%, less than 20%, or less than 10%. The silicone alkyd and acrylic emulsion favor different solvents because of their polymer structures, therefore a blended cosolvent composition improves flow, leveling and gloss development.

In an embodiment, the sealant utilizes alkyd dispersions of various oil lengths reacted with silicone monomers to create a hybridized alkyd. The silicone-modified alkyd resin used herein refers to the reaction product of a diacid or anhydride, polyol, and drying oil further reacted with silicone. The resin as such is a silicone-modified alkyd dispersion with an oil length determined by the drying oil selected.

Alkyd resins including low-molecular weight alkyd dispersions reacted with silicones, such as silanes, siloxanes and fluorinated silicones, exhibit exceptional wetting characteristics and ultra-high gloss, even on pigmented antiqued surfaces of decorative concrete. This is attributed to the oil and silicone modification of the alkyd dispersion, which promotes low surface tension and excellent hold out of the sealant with its demonstrated higher application viscosity analogous to solvent-based sealants.

In another embodiment, the sealant utilizes alkyd dispersions of various oil lengths reacted with acrylic monomers to create a hybridized alkyd. The acrylic-modified alkyd resin dispersion used herein refers to the reaction product of a diacid or anhydride, a polyol, and a drying oil further reacted with acrylic monomers such as acrylic or methacrylic acid or esters thereof. The resin as such is an acrylic-modified alkyd dispersion with an oil length determined by the drying oil selected. Modification with acrylics provides similar benefits as the silicone-modified embodiments. The silicone component may be present in the relation to the modified alkyd component in a weight ratio of, for example 20:80 to 40:60, such as 25:75 to 35:65. The acrylate component may be present in the relation to the modified alkyd component in a weight ratio of, for example: 10:90 to 60:40, such as 15:85 to 50:50.

Some examples of silicone modifiers include: hydroxyl functional siloxanes or silicones of the type silanol PDMS (polydimethylsiloxane). Commercially available products include Wacker Chemie's E2N, E6N, 6MLV, E20N, E50N, and F1006 reacted with the alkyd through its hydroxyl and carboxylic acid moieties.

Some examples of the acrylic modifiers include: monomers containing acrylic, methacrylic, hydroxyl and allyl functionality, that later polymerized onto the alkyd. For example, acrylics formed from the reaction product of hydroxyethyl acrylate (HEMA) and analogs thereof as well as methyl methacrylate, 2-ethylhexyl acrylate, butyl acrylate, allyl methacrylate, reacted with the alkyd through its unsaturation or hydroxyl and carboxylic acid moieties. Blends of acrylic monomers may also be used as the acrylic modifier.

In another embodiment, a combination of both a silicone-modified alkyd dispersion and an acrylic-modified alkyd dispersion are used, for example, in a ratio of from 1:1 to 4:1 or from 1:4 to 1:1.

The drying oil contains units of unsaturation, such as carbon-carbon double bonds or conjugated double bonds. The concentration of drying oil may be selected from short, medium, or long oils, as those terms are used by those of skill in the art. In an embodiment, medium oil provides an excellent balance of a short drying time and gloss enhancement. The drying oil may be present, for example, in an amount of 5 to 45%, such as 8 to 30%, or 10 to 20% by weight based on the total sealant weight.

Some examples of the drying oil include: oils with unsaturation such as tall oil fatty acid, sunflower oil, safflower oil, soybean oil, linseed oil, ricinoleic oil, castor oil and analogs thereof.

The sealant also includes an aqueous dispersion of metal salt catalyst. The metal salt catalyst is used to promote fast drying and a hard, durable surface. Metal salts form excellent catalysts to speed up peroxide formation at sites of unsaturation within the drying oil portions of alkyd resins. The metal salt catalyst may be present, for example, in an amount of 0.01% to 10%, such as 2% to 7%, or 0.5% to 5%.

Some examples of the metal salt catalysts, include: metal salts of cobalt, zirconium, manganese, and calcium complexed with naphthenates, naphthenic acid, and 2-ethylhexanoic acid, or iron metal complexed with organic ligands forming pyridinyl and dicarboxylate salts of Iron (I) and Iron (II). Specific examples include: COBALT HYDROCURE (II) from OMG Inc., ZIRCONIUM HYDRO-CEM, and BORCHI OXY-COAT an iron catalyst from OMG, Inc.

In an embodiment, a catalyst accelerator is also included in the sealant. An example accelerator is Drier Rx HF.

The catalyst accelerator may be present in the sealant, for example, in an amount ranging from 0.001 to 5%, such as 0.01 to 2%, or 0.05 to 0.5% by weight of the sealant.

In an embodiment, the pH of the dispersion is adjusted to be basic. For example, a base, such as ammonium hydroxide may be added to adjust the pH to be in the range of 7.1 to 10, such as 8.5 to 10, 8 to 9.5, or 8 to 9. The acid groups on the alkyd react with the ammonium hydroxide base to form water-soluble salt complexes that promote solubility of the resin into water. For example, the base may be present in a range of 4 to 8% by weight based on the alkyd resin solids content. Other acceptable amine neutralizing agents include: morpholine, triethylamine, triethanolamine, diethanolamine, diethylaminoethanol, monoisopropanolamine, aminomethylpropanol (AMP-95), and other volatile amine analogs.

In an embodiment, and particularly in combination with the acrylic-modified alkyd resin embodiment, the compositions of the sealant include at least one, and optionally multiple silane and siloxane oligomers, such as alkyltrialkoxysilanes and alkyaryly oligomerous siloxanes. The effects of these moieties are defined by the number of Si—O— bonds present combined with the number of direct Si—C bonds, which are more stable towards hydrolysis than the aforementioned alkoxy linkages. Alkoxy groups will easily hydrolyze in the presence of alkaline or acidic aqueous conditions to form polysiloxanes. The silane and siloxane oligomers crosslink the film, thereby increasing its hardness and providing enhanced water resistance.

In an embodiment, the sealant comprises a self-crosslinking acrylic emulsion that functions to aid the sealant in achieving a faster rate of drying, such as up to three times faster. Without being bound to theory it is also believed that the self-crosslinking acrylic emulsion reduces haze in the film. Self-crosslinkable acrylics can react by one of the following example functional groups to produce a thermosetting resin: acrylic or methacrylic acid reacting with a glycidyl group with or without basic catalyst, hydroxyl alkyl acrylate or methacrylate undergoing reaction with alkoxyamino groups under acidic conditions, methylol acrylamide reaction with glycidyl or alkoxyamino groups, glycidoxy(meth)acrylate reacting with amino functional polymers and etherified methylols react with alkyds under acidic or alkaline conditions.

The self-crosslinking acrylic emulsion may be emulsified in water, wherein the water is present, for example, in an amount of 25 to 75%, such as 35 to 65%, or 40 to 60% by weight. The emulsion may be present in the sealant, for example, in an amount of 1 to 25% by weight, such as 3 to 20%, or 5 to 15%.

Some examples of the acrylics that may be used in the acrylic emulsion include: ENGINEERED POLYMER SYSTEMS EPS 2293, ALBERDINGK-BOLEY AC 2772 VP, AC 2728, M 2955 and BASF JONCRYL 2970.

In an embodiment, the sealant comprises halogenated polymers, such as halogenated silicones, that function to reduce surface tension. These halogenated polymers enhance the faster attainment of dynamic surface tension. In an embodiment, the halogenated polymer is a fluorinated silicone polymer. Halogenation of the silicone polymer therefore increases wetting at surfaces leading to better adhesion and deeper penetration of the substrate. The halogenated polymer in the sealant allows the porous concrete or masonry surface to have enhanced water resistance and enhanced resistance to stains caused by oils, such as condiments, wines, and other oily substances that might typically be used on outdoor patios, garage floors, walkways, and driveways.

The halogenated polymers may be present in the sealant, for example, in an amount ranging from 1 to 25%, such as 10 to 20%, or 12 to 18% by weight.

Some examples of the halogenated polymer include: ADVANCED POLYMERS API-279, DUPONT CAPSTONE ST-100HS and ST-110, DAIKIN GMW-605, SARTECH GEO HW, and MITSUBISHI POLON MF-56.

In an embodiment, wetting agents and defoaming agents, such as those commonly used in films, may also be used in the sealant. Such agents lower the surface tension and minimize separations and defects in the film, such as "fish-eyes."

Some examples of the wetting and defoaming agents include SURFYNOL 2502 (wetting agent), DYNOL 604 (wetting agent) and SURFYNOL DF-58 or BYK-024 (defoamers).

The wetting agents and defoaming agents may be present in the sealant, for example, in an amount ranging from 0.001 to 3%, such as 0.01 to 2%, or 0.05 to 1% by weight.

In an embodiment, an anti-skinning agent is used in the sealant. An anti-skinning agent is an additive separate from the wetting agents and defoamers. It functions to render the alkyd more stable in the container over long periods of storage by preventing the formation of a skin at the top surface of the liquid.

An example of the anti-skinning agent includes methylethylketoxime, such as SKINO No. 2.

The anti-skinning agent may be present in the sealant, for example, in an amount ranging from 0.001 to 3%, such as 0.01 to 2%, or 0.05 to 1% by weight.

In an embodiment, a coalescent, such as those commonly used in films, may also be used in the sealant. The coalescent is used to soften the particles of the sealant, thereby promoting film formation. It also allows application of the sealant at a lower temperature, e.g. down to 50° F.

Some examples of the coalescent include: TEXANOL (2,2,4-trimethyl-1,3-pentanediol monoisobutyrate) and BUTYL CELLOSOLVE (ethylene glycol monobutyl ether).

The coalescent may be present in the sealant, for example, in an amount ranging from 0.001 to 3%, such as 0.01 to 2%, or 0.05 to 1% by weight.

In an embodiment, an anionic wax emulsion, may also be used in the sealant. The anionic wax emulsion is used to aid in improving water repellance.

Examples of the anionic wax emulsion include: MICHEM EMULSION 62330 from MICHELMAN CO.

The leveling agent may be present in the sealant, for example, in an amount ranging from 0.001 to 5%, such as 0.01 to 3%, or 0.25 to 2% by weight.

In an embodiment, a leveling agent, such as those commonly used in films, may also be used in the sealant. The leveling agent is used to aid in flow and leveling of the sealer and reduces surface defects such as cratering, orange peel and "fish eyes."

Examples of the leveling agent include: BYK-380N and BYK-346 from BYK Chemie.

The leveling agent may be present in the sealant, for example, in an amount ranging from 0.001 to 5%, such as 0.01 to 2%, or 0.05 to 1% by weight of the sealant.

In an embodiment, a UV absorber, such as those commonly used in films, may also be used in the sealant. The UV absorber is used to promote stability of the chemical composition and prevent it from yellowing, thereby providing a longer-lasting and consistent appearance.]

An example of the UV absorber includes a blend of substituted hydroxyphenol benzotriazole with hindered tertiary amines, such as TINUVIN 123-DW.

The UV absorber may be present in the sealant, for example, in an amount ranging from 0.001 to 5%, such as 0.01 to 2%, or 0.05 to 1% by weight of the sealant; or, for example, 1 to 10%, such as 2 to 8%, or 3 to 5% by weight based on the alkyd resin solid content.

In an embodiment, a biocide is included in the sealant. The biocide is used to protect the finished product from bacterial growth in the packaged container. An example biocide is MERGAL 174.

The biocide may be present in the sealant, for example, in an amount ranging from 0.001 to 5%, such as 0.01 to 2%, or 0.05 to 2% by weight of the sealant.

In an embodiment, a freeze/thaw agent such as those commonly used in films, may also be used in the sealant. The freeze/thaw agent provides improvements in freeze-thaw resistance.

An example of the freeze/thaw agent is ethylene glycol.

The freeze/thaw agent may be present in the sealant, for example, in an amount ranging from 0.001 to 3%, such as 0.01 to 2%, or 0.05 to 1% by weight.

In an embodiment, the acrylic- or silicone-modified alkyd resin and other chemicals listed above are blended with an additional amount of water, such as deionized water. The additional water may be present, for example, in a minority or coequal amount with the other chemicals, such as in an amount of 20 to 70%, such as 30 to 60%, or 40 to 50% by weight.

In an example, the sealant includes an acrylic- or silicone-modified alkyd resin dispersed in aqueous solution, silane and siloxane oligomers based on phenylmethyl methoxydisilane, phenylmethyltrimethoxysilane, methyltrimethoxysilane, n-octyltrimethoxysilane, or the equivalent triethoxysilanes, self-crosslinking acrylic copolymer, fluorinated silicone polymer and metal salt catalysts to react the unsaturation within the alkyd dispersion.

In another example, the sealant includes a silicone-modified alkyd resin dispersion in aqueous solution, a base, a self-crosslinking acrylic emulsion, a metal salt catalyst, an anti-skinning agent, a defoaming agent, a wetting agent, a UV absorber, and a freeze/thaw agent.

In an example method of making the sealant, the acrylic- or silicone-modified alkyd resin is pumped into a clean stainless steel mixing vessel equipped with an impeller type mixer. A base, such as ammonium hydroxide is pre-mixed into the total amount of water required in the batch. Once diluted, the aqueous ammonical solution is pumped into the vessel containing the modified alkyd while maintaining continuous mixing. Once the alkyd is completely neutralized, the metal driers, wetting agents, defoaming agents, anti-skinning agent, coalescents, biocides, and all surfactants and leveling agents are added sequentially, or in an embodiment simultaneously. Next, the self-crosslinking acrylic emulsion is pumped in under continued agitation. In some embodiments, the siloxane oligomer and halogenated polymer may be pumped in under continued agitation at this time. A UV absorber is then added followed by sequential addition of any cosolvents. The freeze-thaw agent is then added for improved freeze thaw resistance, although the cosolvents could also be added last. The pH is monitored throughout the process and maintained in the range from 7.0 to 10.0, such as 7.5 to 9.5, or 8.0 to 9.0. with the addition of a base, such as an amine, as necessary. Upon completion, the finished product is filtered through a 400 micron rated polyester fiber filter into appropriate containers. This general method may also be employed for making either the acrylic- or silicone-modified resin version of the sealant. The example process may be performed at room temperature, and under continuous agitation. After all ingredients are added the composition may be mixed, for example, at least 15 minutes or at least 30 minutes, such as 15 to 45 minutes. The composition should be mixed for a sufficient time to make the composition appear uniform in viscosity, consistency, and color.

In practice, the sealant may be applied to previously sealed concrete or masonry surfaces. For optimum effectiveness, the sealant should be applied at a temperature between 40° to 95° F., such as 50° to 80° F., or 60° to 70° F.

The sealant is applied over a previously treated and/or sealed surface. The previously applied sealant will likely be solvent-based that contained a high VOC content, such as an acrylic lacquer. The breathable nature of the sealant allows several coats to be applied without excessive haze build up, such as 2-10, 2-5, 3-6, or 4-8 coats. For example, the surface may have less than 20% haze after 4 coatings, such as less than 15% or less than 10% haze after four coatings. Accordingly, the concrete or masonry sealant may comprise: an acrylic-modified or silicone-modified reaction product of an unsaturated drying oil and an alkyd, the reaction product being dispersed in aqueous solution; a dispersion of metal salt catalyst in aqueous solution, when applied to a concrete or masonry surface in three coatings, where the surface exhibits no haze. Additional coats of the sealant may be applied after the glossy appearance of the surface starts to fade. Application can be performed, for example, by spraying, rolling, or brushing the sealant on the surface.

For optimum effectiveness the sealant should be allowed to dry and cure without moisture, such as from rain, for at least 8 hours, such as 8 to 24 hours, at least 16 hours, or 12 to 16 hours. The sealant should be cured within 24 hours, such as within 16 hours, or within 8 hours, for example, between 8 and 16 hours.

In an example, the sealant has particular usefulness when used on stamped or decorative concrete that contains decorative impressions and may include pigmentation. For example, in a decorative concrete mix, pigments are added integrally into the mix to produce a base color, while also used in the subsequent antiquing release compound to provide a contrast color. The antiquing release is commonly heavily laden with metal stearates that provide lubricity so the decorative stamps can be pressed into the freshly placed concrete to create the imprint of the stamp without pulling up any surface paste. The antiquing release is liberally spread over the entire surface of the freshly placed and floated surface of the concrete just prior to the stamping operation. The following day some portion ranging from 50% to 80% of the antiquing release is removed with a pressure wash.

Typically, the existing surface of the concrete or masonry surface will be dull and lacking the vibrancy of the original color, especially in the case of stamped integrally colored concrete. In the event the concrete or masonry was not sealed previously or the previous application of sealant has completely or partially worn away, a color enhancing pretreatment may first be applied to the surface prior to application of the gloss restoring sealant. For example, the pretreatment may comprise the pretreatment described in U.S. provisional application 61/432,971, titled "Gloss restoration of sealed decorative concrete and masonry surfaces," which is incorporated herein by reference. The pretreatment is a clear composition designed to penetrate and restore the color and richness of the concrete or masonry to its original intensity. The color enhancing pretreatment further enhances the deep, rich tones of the integrally colored concrete or masonry that was once visible when the original sealant was intact. If the concrete or masonry was never previously sealed then the color is locked away within the concrete matrix waiting to be revealed and highlighted with the application of the color enhancing pretreatment. The sealant described herein is breathable, which is beneficial for the pretreatment in that it prevents the development of haze, whitening and blushing.

The sealant, if desired or necessary (after several coats), may be removed with water-based solvents and a light pressure washing procedure that does not kill vegetation.

EXAMPLES

The following examples are representative of, but not limitations on, the sealant described above (amounts are given in percentages by weight):

Prospective Examples

In Examples 1-11 sealant compositions can be made by combining under continuous mixing and at room temperature, the components listed in Table 1. First, the acrylic- or silicone-modified alkyd resin is pumped into a clean stainless steel mixing vessel equipped with an impeller type mixer. A base, such as ammonium hydroxide, is pre-mixed into the total amount of deionized water required in the batch. Once diluted, the aqueous ammonical solution is pumped into the vessel containing the modified alkyd while maintaining continuous mixing. Once the alkyd is completely neutralized, the metal catalyst, catalyst accelerator, wetting agents, defoaming agents, anti-skinning agent, anionic wax emulsion, leveling agent, coalescents, biocide, and all surfactants and leveling agents are added sequentially. Next, the self-crosslinking acrylic emulsion is pumped in under continued agitation. If present, the siloxane oligomer and halogenated polymer are added at this time. Cosolvents are then added. The freeze-thaw agent is then added. The pH is monitored throughout the process and maintained in the range from 8.0 to 9.5 with the addition of a base, such as an amine, as necessary. Upon completion, the finished product is filtered through a 400 micron rated polyester fiber filter into appropriate containers. After all ingredients are added the composition are mixed for at least 30 minutes or for a sufficient time to make the composition appear uniform in viscosity, consistency, and color.

TABLE 1

|  | % Non-Volatile | Volatile Portion | 1 | 2 | 3 | 4 | 5 | 6 | 7 |
|---|---|---|---|---|---|---|---|---|---|
| Self-Crosslinking Resin | | | | | | | | | |
| EPS 2293 Acrylic Emulsion (%43 active) | 40% | Water (no solvent) | 20-30 | 20-30 | 20-30 | 30-40 | 30-40 | 10-30 | 10-15 |
| Acrylic-Modified Alkyds | | | | | | | | | |
| SYNAQUA AD 821-2241 | 37% | Water (0.55% Glycol Ether DPM) | 50-60 | 50-60 | | | | | |
| SYNAQUA AD 821-1364 | 40% | Water (4% Glycol Ether DPM) | | | 50-60 | | | | |
| SYNAQUA AD 821-2220 | 39.5% | Water (4% Glycol Ether DPM) | | | | 50-60 | | | |
| CHEMPOL MPS-2410 | 55% | Water (no solvent) | | | | | 40-50 | | |
| Silicone-Modified Alkyd | | | | | | | | | |
| REZIMAC WR74-7435 | 75% | 25% glycol ether EB (no water) | | | | | | 20-60 | 20.0-30.0 |
| Coalescent | | | | | | | | | |
| EPS 9147 Coalescent | | | 0-5 | | 0-5 | 0-5 | 0-5 | 0-5 | 0-5 |
| Deionized Water (with 2% ammonium hydroxide) | | | 21.5-41.5 | 15-45 | 21.5-41.5 | 21.5-41.5 | 21.5-41.5 | 21.5-41.5 | 21.5-41.5 |
| Wetting and Defoaming Agents | | | | | | | | | |
| SURFYNOL DF-58 | | | 0.05-0.5 | | 0.05-0.5 | 0.05-0.5 | 0.05-0.5 | 0.05-0.5 | 0.05-0.5 |
| POLYFOX TM-1 | | | 0.05-0.5 | | 0.05-0.5 | 0.05-0.5 | 0.05-0.5 | 0.05-0.5 | 0.05-0.5 |
| SURFYNOL 2502 | | | | 0.0-2.5 | | | | | |
| Leveling agents | | | | | | | | | |
| BYK-346 | | | | 0.05-0.5 | | | | | |
| BYK-380N | | | 0.05-0.5 | | 0.05-0.5 | 0.05-0.5 | 0.05-0.5 | 0.05-0.5 | 0.05-0.5 |
| Metal Salt Catalyst | | | | | | | | | |
| COBALT HYDRO-CURE II (5% in water) | | | 0.05-1 | | 0.05-1 | 0.05-1 | 0.05-1 | 0.05-1 | 0.05-1 |
| ZIRCONIUM HYDRO-CEM II (12% in water) | | | 0.05-2 | | 0.05-2 | 0.05-2 | 0.05-2 | 0.05-2 | 0.05-2 |
| BORCHI OXY-COAT | | | | 0-2 | | | | | |
| Catalyst Accelerator | | | | | | | | | |
| DRIER RX HF | | | 0.05-0.5 | | 0.05-0.5 | 0.05-0.5 | 0.05-0.5 | 0.05-0.5 | 0.05-0.5 |
| Co-Solvent | | | | | | | | | |
| TEXANOL | | | 0-2.5 | | 0-2.5 | 0-2.5 | 0-2.5 | 0-2.5 | 0-2.5 |
| Freeze/thaw agent | | | | | | | | | |
| Ethylene Glycol | | | 0-2 | | 0-2 | 0-2 | 0-2 | 0-2 | 0-2 |
| Biocide | | | | | | | | | |
| MERGAL 174 | | | 0.05-0.2 | | 0.05-0.2 | 0.05-0.2 | 0.05-0.2 | 0.05-0.2 | 0.05-0.2 |

|  | % Non-Volatile | Volatile Portion | 8 | 9 | 10 | 11 |
|---|---|---|---|---|---|---|
| Acrylic Emulsion | | | | | | |
| EPS 2293 Acrylic Emulsion (%43 active) | 40% | Water (no solvent) | 30-40 | 30-40 | 30-40 | 30-40 |

TABLE 1-continued

| Acrylic Modified Alkyd | | | | | | |
|---|---|---|---|---|---|---|
| BECKOSOL AQ 510 | 61% | Water (no solvent) | 40-50 | | | |
| BECKOSOL AQ 206 | 55% | Water (no solvent) | | 40-50 | | |
| BECKOSOL AQ 210 | 55% | Water (no solvent) | | | 40-50 | |
| BECKOSOL AQ 520 | 51% | Water (1.5% propoxy propanol) | | | | 40-50 |
| Coalescent | | | | | | |
| EPS 9147 Coalescent | | | 0-5 | 0-5 | 0-5 | 0-5 |
| Deionized Water (with 2% ammonium hydroxide) | | | 21.5-41.5 | 21.5-41.5 | 21.5-41.5 | 21.5-41.5 |
| Wetting and Defoaming Agents | | | | | | |
| SURFYNOL DF-58 | | | 0.05-0.5 | 0.05-0.5 | 0.05-0.5 | 0.05-0.5 |
| POLYFOX TM-1 | | | 0.05-0.5 | 0.05-0.5 | 0.05-0.5 | 0.05-0.5 |
| SURFYNOL 2502 | | | | | | |
| Leveling agent | | | | | | |
| BYK-346 | | | | | | |
| BYK 380N | | | 0.05-0.5 | 0.05-0.5 | 0.05-0.5 | 0.05-0.5 |
| Metal Salt Catalyst | | | | | | |
| COBALT HYDRO-CURE II (5% in water) | | | 0.05-1 | 0.05-1 | 0.05-1 | 0.05-1 |
| ZIRCONIUM HYDROCEM II (12% in water) | | | 0.05-2 | 0.05-2 | 0.05-2 | 0.05-2 |
| BORCHI OXY-COAT | | | | | | |
| Catalyst Accelerator | | | | | | |
| DRIER RX HF | | | 0.05-0.5 | 0.05-0.5 | 0.05-0.5 | 0.05-0.5 |
| Co-Solvent | | | | | | |
| TEXANOL | | | 0-2.5 | 0-2.5 | 0-2.5 | 0-2.5 |
| Freeze/Thaw Agent | | | | | | |
| Ethylene Glycol | | | 0-2 | 0-2 | 0-2 | 0-2 |
| Biocide | | | | | | |
| MERGAL 174 | | | 0.05-0.2 | 0.05-0.2 | 0.05-0.2 | 0.05-0.2 |

WORKING EXAMPLES

Examples A-J

The following working examples were made according to the method listed for the Prospective Examples above, but based on the formulae listed in Table 2. Examples A-J are examples utilizing the Acrylic-Modified Alkyd. TABLE 2 shows results indicating how quickly the Examples were weather proof.

TABLE 2

| | A | B | C | D | E | F | G | H | I | J |
|---|---|---|---|---|---|---|---|---|---|---|
| Acrylic Emulsion | | | | | | | | | | |
| EPS 2293 Acrylic Emulsion (%43 active) | 0.00 | 10.00 | 10.00 | 0.00 | 20.00 | 20.00 | 0.00 | 0.00 | 0.00 | 10.00 |
| Acrylic Modified Alkyd (in water) | | | | | | | | | | |
| SYNAQUA AD 821-2241 (37% solids acry-alkyd) | 0.00 | 0.00 | 0.00 | 0.00 | 50.00 | 0.00 | 0.00 | 0.00 | 0.00 | 0.00 |
| SYNAQUA AD 821-2300 (40% solids acry-alkyd) | 0.00 | 0.00 | 0.00 | 0.00 | 0.00 | 50.00 | 0.00 | 0.00 | 0.00 | 0.00 |
| BECKSOL AQ 210 (55% solids chain stopped alkyd) | 25.00 | 20.00 | 20.00 | 15.00 | 0.00 | 0.00 | 0.00 | 0.00 | 0.00 | 0.00 |
| BECKSOL AQ 510 (61% acrylic long oil alkyd) | 25.00 | 20.00 | 20.00 | 15.00 | 0.00 | 0.00 | 15.00 | 15.00 | 15.00 | 10.00 |

TABLE 2-continued

|  | A | B | C | D | E | F | G | H | I | J |
|---|---|---|---|---|---|---|---|---|---|---|
| BECKSOL AQ 206 (55% medium oil alkyd) | 0.00 | 0.00 | 0.00 | 0.00 | 0.00 | 0.00 | 15.00 | 15.00 | 15.00 | 10.00 |
| Deionized Water | 46.80 | 46.00 | 46.00 | 45.30 | 24.05 | 24.05 | 44.80 | 44.80 | 44.80 | 43.80 |
| Wetting and Defoaming Agents | | | | | | | | | | |
| SURFYNOL DF-58 | 0.02 | 0.02 | 0.02 | 0.02 | 0.02 | 0.02 | 0.02 | 0.02 | 0.02 | 0.02 |
| SURFYNOL 2502 | 0.05 | 0.05 | 0.05 | 0.05 | 0.05 | 0.05 | 0.05 | 0.05 | 0.05 | 0.05 |
| Leveling agent | | | | | | | | | | |
| BKY-380 N LEVELING AGENT | 0.05 | 0.05 | 0.05 | 0.05 | 0.05 | 0.05 | 0.05 | 0.05 | 0.05 | 0.05 |
| BKY-346 LEVELING AGENT | 0.20 | 0.20 | 0.20 | 0.20 | 0.20 | 0.20 | 0.20 | 0.20 | 0.20 | 0.20 |
| Anti-skinning Agent | | | | | | | | | | |
| SKINO No. 2 | 0.10 | 0.10 | 0.10 | 0.10 | 0.10 | 0.10 | 0.10 | 0.10 | 0.10 | 0.10 |
| Anionic Wax Emulsion | | | | | | | | | | |
| MICHEM EMULSION 62330 ANIONIC WAX | 1.00 | 1.00 | 1.00 | 1.00 | 1.00 | 1.00 | 1.00 | 1.00 | 1.00 | 1.00 |
| Metal Catalyst | | | | | | | | | | |
| COBALT HYDRO-CURE II (5% in water) | 0.30 | 0.20 | 0.20 | 0.00 | 0.00 | 0.00 | 0.30 | 0.30 | 0.30 | 0.30 |
| ZIRCONIUM HYDRO-CEM II (12% in water) | 1.20 | 1.00 | 1.00 | 1.00 | 1.25 | 1.25 | 1.20 | 1.20 | 1.20 | 1.20 |
| BORCHI OXY-COAT | 0.00 | 0.00 | 0.00 | 2.00 | 1.00 | 1.00 | 0.00 | 0.00 | 0.00 | 0.00 |
| Catalyst Accelerator | | | | | | | | | | |
| DRIER RX HF | 0.10 | 0.10 | 0.10 | 0.10 | 0.10 | 0.10 | 0.10 | 0.10 | 0.10 | 0.10 |
| UV Absorber | | | | | | | | | | |
| TINUVIN 123 DW | 0.00 | 0.00 | 0.00 | 0.00 | 0.00 | 0.00 | 2.00 | 2.00 | 2.00 | 2.00 |
| Co-Solvent | | | | | | | | | | |
| TEXANOL | 0.00 | 0.80 | 1.10 | 0.00 | 1.00 | 1.00 | 0.00 | 0.00 | 0.00 | 1.00 |
| Halogenated polymer | | | | | | | | | | |
| SARTECH GEO HW FLUOROPOLYMER | 0.00 | 0.00 | 0.00 | 20.00 | 0.00 | 0.00 | 0.00 | 0.00 | 0.00 | 0.00 |
| DAIKON S-605 FLUOROPOLYMER | 0.00 | 0.00 | 0.00 | 0.00 | 0.00 | 0.00 | 0.00 | 0.00 | 18.00 | 0.00 |
| API-279 FLUORINATED ACRYLIC COPOLYMER | 0.00 | 0.00 | 0.00 | 0.00 | 0.00 | 0.00 | 18.00 | 18.00 | 0.00 | 18.00 |
| Siloxane Oligomers | | | | | | | | | | |
| COATOSIL 2287 SILOXANE | 0.00 | 0.00 | 0.00 | 0.00 | 0.00 | 0.00 | 2.00 | 0.00 | 0.00 | 0.00 |
| QP9-5314 SILOXANE | 0.00 | 0.00 | 0.00 | 0.00 | 1.00 | 1.00 | 0.00 | 2.00 | 2.00 | 2.00 |
| Biocide | | | | | | | | | | |
| MERGAL 174 | 0.18 | 0.18 | 0.18 | 0.18 | 0.18 | 0.18 | 0.18 | 0.18 | 0.18 | 0.18 |

TABLE 3

|  | A | B | C | D | E | F | G | H | I | J |
|---|---|---|---|---|---|---|---|---|---|---|
| Water Spot Resistance (2-Hour) | GOOD | GOOD | GOOD | GOOD | POOR | FAIR | FAIR | GOOD | V. GOOD | GOOD |
| Blush Resistance (Long Term) | GOOD | GOOD | GOOD | GOOD | FAIR | GOOD | GOOD | GOOD | V. GOOD | GOOD |
| Tack-free, Hrs | 4.0 | 4.0 | 4.0 | 4.0 | 6.0 | 4.5 | 3.5 | 3.5 | 4.5 | 4.0 |

Examples K-R

The following working examples were made according to the method listed for the Prospective Examples above but based on the formulae listed in Table 3. Examples K-R are examples utilizing the Silicone-Modified Alkyd. TABLE 4 shows results indicating how quickly the Examples were weather proof.

TABLE 4

| | K | L | M | N | O | P | Q | R | S |
|---|---|---|---|---|---|---|---|---|---|
| Silicone-modified alkyd resin | | | | | | | | | |
| REZIMAC WR 74-7435 Base | 75.0 | 26.46 | 26.46 | 26.46 | 26.46 | 26.46 | 26.46 | 26.46 | 20.46 |
| Ammonium Hydroxide | 2.10 | 1.18 | 0 | 1.18 | 0 | 0 | 0 | 0 | 0 |
| MORPHOLINE | | 0.05 | 1.23 | 0.05 | 1.23 | 1.23 | 1.23 | 1.23 | 1.23 |
| Water | | 19.01 | 19.01 | 19.01 | 19.01 | 19.01 | 19.01 | 19.01 | 19.01 |
| Acrylic Emulsion | | 37.79 | 37.79 | 28.79 | 29.39 | 29.39 | 37.39 | 36.89 | 36.89 |
| EPS 2293 | 12 | 12.00 | 12.00 | 10.00 | 10.00 | 10.00 | 10.00 | 12.00 | 18.00 |
| Metal salt Catalyst | | | | | | | | | |
| COBALT HYDRO-CURE II | 1 | 0.20 | 0.20 | 0.20 | 0.20 | 0.20 | 0.20 | 0.20 | 0.20 |
| ZIRCONIUM HYDRO-CEM | 4 | 0.78 | 0.78 | 0.78 | 0.78 | 0.78 | 0.78 | 0.78 | 0.78 |
| Catalyst Accelerator | | | | | | | | | |
| DRIER Rx | 0.10 | 0.10 | 0.10 | 0.10 | 0.10 | 0.10 | 0.10 | 0.10 | 0.10 |
| Wetting, anti-skin, and defoaming agents | | | | | | | | | |
| SKINO NO. 2 (anti-skinning agent) | 0.25 | 0.05 | 0.05 | 0.05 | 0.05 | 0.05 | 0.05 | 0.05 | 0.05 |
| SURFYNOL DF-58 | 0.01 | 0.01 | 0.01 | 0.01 | 0.01 | 0.01 | 0.01 | 0.01 | 0.01 |
| SURFYNOL 2502 | 0.04 | 0.04 | 0.04 | 0.04 | 0.04 | 0.04 | 0.04 | 0.04 | 0.04 |
| Leveling Agent | | | | | | | | | |
| BYK 346 | 0.18 | 0.18 | 0.18 | 0.18 | 0.18 | 0.18 | 0.18 | 0.18 | 0.18 |
| BYK 380N | 0.05 | 0.04 | 0.04 | 0.04 | 0.04 | 0.04 | 0.04 | 0.04 | 0.04 |
| UV Absorber | | | | | | | | | |
| TINUVIN 1130 | | 0.40 | 0.00 | 0.00 | 0.00 | 0.00 | 0.00 | 0.50 | 0.50 |
| TINUVIN 123-DW | 3 | 0.00 | 0.40 | 1.00 | 1.00 | 1.00 | 1.00 | 1.00 | 1.00 |
| Cosolvents (1-to-1-to-1 ratio) TEXANOL/N-Butyl Alcohol/EB Acetate | 1.5 | | | | | | | | |
| TEXANOL | | 0.29 | 0.29 | 0.29 | 0.29 | 0.29 | 0.29 | 0.29 | 0.29 |
| Glycol Ether Eb Acetate | | 0.61 | 0.61 | 0.61 | 0.61 | 0.61 | 0.61 | 0.61 | 0.61 |
| Glycol Ether Eb | | 0.61 | 0.31 | 0.61 | 0.00 | 0.00 | 0.00 | 0.00 | 0.00 |
| N-Butyl Alcohol | | 0.00 | 0.31 | 0.00 | 0.61 | 0.61 | 0.61 | 0.61 | 0.61 |
| Glycol Ether Eb | | 0.20 | 0.20 | 0.60 | 0.00 | 0.00 | 0.00 | 0.00 | 0.00 |
| Freeze/Thaw Agent | | | | | | | | | |
| Ethylene Glycol | 1 | | | | | | | | |
| Siloxane Oligomer | | | | | | | | | |
| QP8-5314 SILOXANE Anionic Wax Emulsion | | 0.00 | 0.00 | 0.00 | 0.00 | 1.00 | 2.00 | 0.00 | 0.00 |
| MICHEM EMULSION 62330 | | 0.00 | 0.00 | 0.00 | 1.00 | 0.00 | 0.00 | 0.00 | 0.00 |
| Halogenated Polymer | | | | | | | | | |
| API-279 Fluoro-acrylate polymer | | 0.00 | 0.00 | 10.00 | 9.00 | 9.00 | 0.00 | 0.00 | 0.00 |

TABLE 5

| | K | L | M | N | O | P | Q | R | S |
|---|---|---|---|---|---|---|---|---|---|
| Blush Resistance (Long Term) | | EXCELLENT | EXCELLENT | GOOD | V. GOOD | V. GOOD | V. GOOD | EXCELLENT | GOOD |
| Tack-Free, Hrs | | 3.5 | 3.5 | 3.5 | 3.5 | 3.5 | 3.5 | 3.5 | 3.5 |

Gloss is a one of the visual perceptions that is caused when a surface is viewed through reflected light. Gloss is that attribute of surfaces that causes them to appear shiny or lustrous, satin or matte. The more direct light is reflected, the more obvious will be the impression of gloss. Gloss effects are based on the interaction of light with the physical properties of the sample surface. Therefore, stamped concrete surfaces will naturally reduce gloss readings, because the surface being evaluated is undulated as contrasted to a completely flat, smooth surface. The fact that the surface of concrete is somewhat porous also lowers the apparent gloss as measured with a gloss meter. The following gloss measurements of various unsealed and sealed concrete surfaces are illustrative of how the sealant rejuvenates example concrete surfaces. All readings were taken at a 60° specular angle. Four runs were done on each Example and were averaged in Table 6.

TABLE 6

| EXAMPLE | AVERAGE of 4 Runs Gloss Units |
|---|---|
| Comparative Example A: Unsealed, red, stamped concrete | 1.0 |
| Comparative Example B: Conventional acrylic lacquer (ELVACITE 2016: 25% copolymer produced from the reaction of methylmethacrylate with butylacrylate dispersed in 75% Aromatic 100) on newly sealed, red, stamped concrete | 26.9 |
| Comparative Example C: Comparative Example B after 1 year of weathering | 11.2 |
| Weathered, sealed, red, stamped concrete of Comparative Example C, restored with sealant in accordance with Example K | 26.1 |

It is claimed:

1. A method comprising:
   providing a sealant coating from a sealant composition over an acrylic lacquer sealant on a concrete or masonry substrate;
   the sealant coating comprising an acrylic- or silicone-modified reaction product of an unsaturated drying oil and an alkyd, the reaction product being dispersed in aqueous solution; and an aqueous dispersion of metal salt catalyst;
   allowing the sealant coating to dry and cure without moisture;
   wherein the acrylic-modified or silicone-modified reaction product of the unsaturated drying oil and the alkyd is 20% to 80% by weight of the sealant composition prior to the drying and curing, and the unsaturated drying oil is present in an amount of 5 to 45% by weight of the sealant composition prior to the drying and curing;
   further comprising applying the composition in four coatings, wherein a surface of the coated concrete or masonry substrate after the four coatings exhibits less than 10% haze; and the surface of the coated concrete or masonry substrate after the four coatings has a minimum 20% surface gloss as measured by a gloss meter at a 60° specular angle.

2. The method of claim 1, wherein the concrete or masonry substrate is an outdoor patio; the concrete or masonry substrate includes pigment, metal stearates or both; or the concrete or masonry substrate is an outdoor patio that includes pigment or metal stearates or both.

3. A sealant composition for masonry or concrete that forms a coating or film, the sealant composition consisting of:
   20% to 80% by weight of the sealant composition of an aqueous dispersion of an acrylic-modified or silicone-modified reaction product of an unsaturated drying oil and an alkyd, and water is 20 to 80% by weight of the aqueous dispersion, and the unsaturated drying oil is present in an amount of 5 to 45% by weight of the sealant composition;
   1 to 40% by weight of the sealant composition of a self-crosslinking acrylic emulsion;
   a dispersion of metal salt catalyst in aqueous solution;
   an additional amount of water in an amount of 20% to 70% by weight of the sealant composition;
   a water repellent or water resistance enhancer component including a silane and/or siloxane oligomer;
   0.001 to 5% by weight of the sealant composition of a catalyst accelerator;
   a halogenated polymer present in an amount of 1 to 25% by weight of the sealant composition;
   one or more of the following: a wetting agent, an anti-skin agent, a defoamer, and a coalescent in an amount of 0.001 to 3% by weight of the sealant composition, and leveling agent in an amount of 0.001 to 5% by weight of the sealant composition;
   a co-solvent present in an amount of 0.001 to 10% by weight of the sealant composition;
   optionally, a freeze-thaw agent in an amount of 0.001 to 3% by weight of the sealant composition;
   a biocide present in an amount of 0.001 to 5% by weight of the sealant composition;
   optionally, a UV absorber in an amount of 0.001 to 5% by weight of the sealant composition;
   a base, present in an effective amount to provide a basic pH to the sealant composition.

4. The method of claim 1, wherein the sealant composition further comprises a halogenated polymer.

5. The method of claim 1, wherein the unsaturated drying oil is a medium oil.

6. The sealant composition of claim 3, wherein the sealant composition has a viscosity of 25 cps to 150 cps.

7. The sealant composition of claim 3, wherein the unsaturated drying oil is a medium oil.

* * * * *